United States Patent

[11] 3,587,313

[72] Inventor Bob L. Smith
         Santa Cruz, Calif.
[21] Appl. No. 795,170
[22] Filed Jan. 30, 1969
[45] Patented June 28, 1971
[73] Assignee I. V. Ometer, Inc., Santa Cruz, Calif.

[54] FLOW METER FOR PARENTERAL SOLUTIONS
     9 Claims, 5 Drawing Figs.
[52] U.S. Cl. ................................................. 73/209
[51] Int. Cl. ................................................. G01p 5/00
[50] Field of Search .................................... 73/194, 209; 128/2.5

[56]  References Cited
      UNITED STATES PATENTS
| | | | |
|---|---|---|---|
| 2,707,879 | 5/1955 | Dwyer | 73/209 |
| 3,034,504 | 5/1962 | Winsor et al. | 73/194 |
| 3,049,918 | 8/1962 | Sparkuhl | 73/209 |
| 3,101,710 | 8/1963 | Koehn | 73/209X |
| 3,233,457 | 2/1966 | Martinez | 73/209 |

*Primary Examiner*—Richard C. Queisser
*Assistant Examiner*—John K. Lunsford
*Attorney*—Gardner & Zimmerman ABSTRACT: A flow meter for measuring the rate of intravenous infusion of parenteral solutions. The flow meter includes a plurality of chambers interconnected one with another in a series relationship such that a solution flows downwardly from a container supplying the same into and through a drip chamber and upwardly therefrom through a measuring chamber for delivery to a patient. The drip chamber enables the solution delivered thereto to be counted drop by drop, and it has a restricted volume adjacent its lower end enabling such end of the chamber to fill quickly. The measuring chamber has a generally logarithmic curvature from end to end thereof cooperative with a ball-shaped restrictor mounted therewithin which is movable along the measuring chamber and defines a flow indicator, the position of which within the chamber is determined by the flow rate therethrough. The flow rate can be varied by adjusting a metering clamp mounted on a compressible tube through which fluid is carried to a patient.

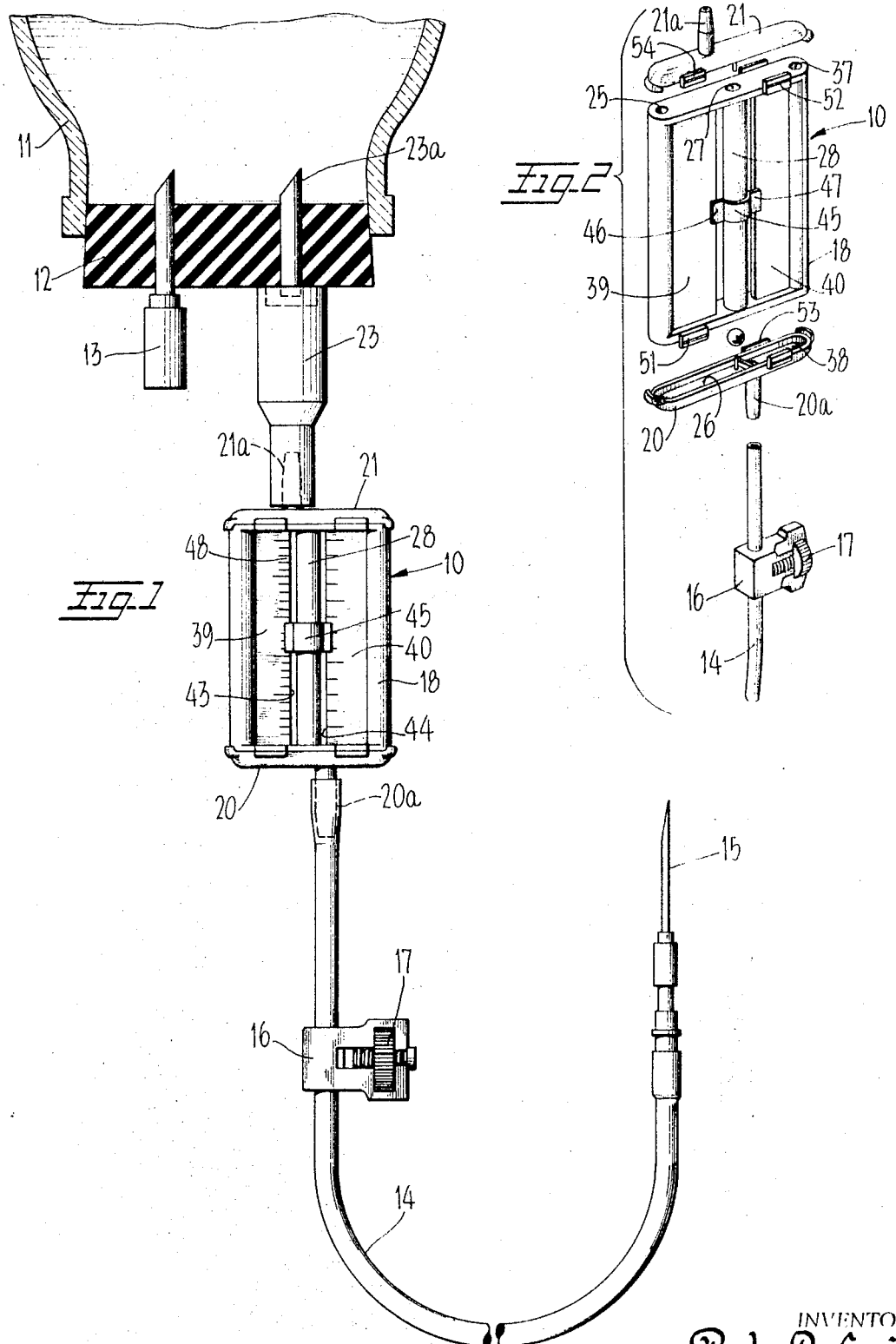

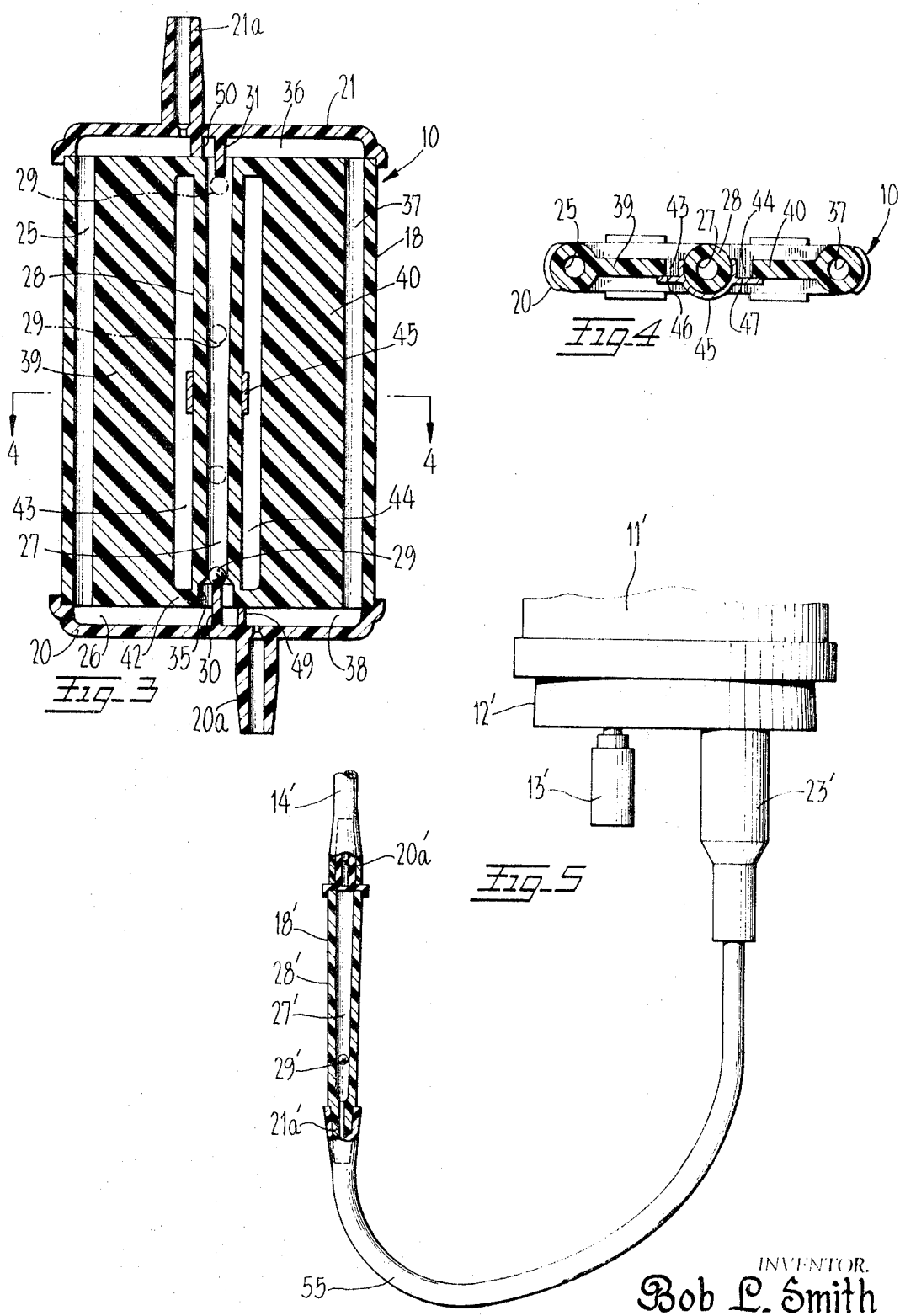

FLOW METER FOR PARENTERAL SOLUTIONS

This invention relates to apparatus for measuring the rate of flow of liquids, and it relates more particularly to a flow meter for measuring the flow rate of parenteral solutions and the like as, for example the rate of intravenous infusion of a saline solution into a patient.

As explained in U.S. Pat. No. 3,034,504, it is usually necessary to control the rate of flow of parenteral solutions into the human body and, traditionally, determination of and control over the flow has been effected by visually counting for a particular time interval the number of drops of such solution delivered drop by drop from a bottle or container supplying the same and carried to a patient by a flow conduit system having a hollow needle penetrating a vein of, or otherwise connected with, the patient. Manual counting is not only time consuming and requires the attention of suitable technical personnel, but it can also be inaccurate due to human vagaries, differences in capability, and error. As a consequence, efforts have been made in the past to provide apparatus for measuring the flow rate automatically to facilitate control thereover, and the flow meter disclosed in the aforementioned U.S. patent is a successful example thereof.

An object of the present invention is to provide an improved flow meter of the general type disclosed in such U.S. Pat. No. 3,034,504 for measuring the rate of flow of parenteral solutions and the like. Another object of the invention is in the provision of an improved flow meter for measuring the rate of intravenous infusion or other flow of parenteral solutions in which a drip chamber is provided so that the flow rate can be monitored visually if desired, and which drip chamber is characterized by filling quickly at its lower end to provide a continuous supply of the solution thereat for delivery to a measuring chamber; in which is provided a measuring chamber of curved configuration from top to bottom thereof having a flow-indicating restrictor mounted therein which cooperates therewith to indicate with considerable accuracy the rate of flow of such solution from a source of supply thereof to a patient; and in which the flow meter in one form thereof is a molded plastic structure having provision to make such measuring chamber structurally symmetrical about the longitudinal axis thereof so that the chamber remains undistorted, particularly in cross section, as the meter is cooled during and immediately subsequent to the molding process. Additional objects and advantages of the invention, especially as concerns particular features and characteristics thereof, will become apparent as the specification develops.

The flow meter in a particular embodiment of the invention includes a compressible drip chamber serving as a primer for the flow system carrying solution from a supply bottle to a patient, and which chamber enables the solution to flow drop by drop therethrough without traversing the sides thereof so that each droplet can be visually counted. The flow meter also has a measuring chamber provided with a logarithmic curvature enlarging from the bottom to the top end thereof, and which measuring chamber is provided with a flow-indicating restrictor therewithin having the form of a sphere that assumes a position along the measuring chamber corresponding to the rate of flow of the solution therethrough. The measuring chamber is secured to the rest of the meter only adjacent the upper and lower ends of such chamber so as to be symmetrical, in a structural sense, about its longitudinal axis and thereby prevent nonuniformity in the rate of cooling of the chamber which would likely lead to distortion thereof in the case in which the meter is a molded synthetic plastic composition.

Embodiments of the invention are illustrated in the accompanying drawings, in which:

FIG. 1 is a side view in elevation of a flow meter embodying the invention, the meter being connected in the flow line between a container providing a supply of fluid and a hollow needle for injection thereof into a patient;

FIG. 2 is an exploded perspective view of the meter and flow-regulating clamp;

FIG. 3 is an enlarged, longitudinal sectional view of the meter;

FIG. 4 is a transverse sectional view taken along the line 4—4 of FIG. 3; and

FIG. 5 is a broken side view in elevation of a modified embodiment of the invention.

The embodiment of the flow meter illustrated in FIG. 1 is denoted in its entirety with the numeral 10, and is shown in association with a container 11 of conventional form having a resilient closure or plug 12 confining a predetermined volume of sterile solution within the container. As respects the present invention, the container, its closure and the solution therein may all be conventional, and for illustrative purposes the particular container shown is a vented type in which the closure 12 is penetrated by a vent 13 furnishing air to the interior of the container to replace solution withdrawn therefrom. Also, arranged with the flow meter 10 is a relatively long flexible compressible tube 14, which may be latex, connected at one end with the flow meter and equipped at its other end with a hollow needle 15 adapted to penetrate a vein for intravenous infusion thereinto of the solution supplied by the container 11. A metering clamp 16 cooperates with the tube 14 and is provided with an adjustable screw 17 that bears against the tube and thereby controls the size of the opening thereof throughout the section passing through the clamp 16. Evidently, adjustment of the clamp 16 controls the rate of flow of solution through the tube 14 and, therefore, from the container 11 to the needle 15. The tube 14, needle 15 and clamp 16 may all be conventional.

The flow meter 10 is formed in three main sections (as shown most clearly in FIG. 2) comprising a body part 18, a passage-defining lower closure 20, and a passage-defining upper closure 21. The flow meter is transparent and in the form shown is made of a moldable plastic material that is substantially inert and impervious to the solutions likely to be encountered thereby. Various conventional plastic materials are suitably employed as, for example, polystyrene. Each of the three components 18, 20 and 21 may be formed of the same material and are integrated in any suitable manner as, for example, by means of adhesive joints along the contiguous surfaces thereof.

An intake nipple or fitting 21a is provided by the closure 21, and such fitting has an inlet passage 22 therethrough that communicates with a drip chamber 23 (FIG. 1) connected with the container 11. The chamber 23 is flexible and compressible and is much larger in cross section than the passage 22 but has a somewhat restricted volume adjacent is lower end at which it merges with the fitting 21a. The configuration is such that the sidewalls of the drip chamber 23 are spaced outwardly from the inlet passage 22 so that the solution slowly dripping downwardly from the container 11 discharges into the drip chamber 23 drop by drop without touching the sidewalls thereof, thereby enabling the rate of flow to be monitored manually by visually counting each drop. Evidently, drop by drop counting cannot be accomplished if the solution entering the chamber 23 runs downwardly along the sidewalls thereof.

The drip chamber 23 is sufficiently transparent to permit each drop of solution to be observed, and it also serves as a primer to initiate a flow of fluid in the system. (Thus, the chamber 23 is flexible as well as transparent,) and it may be formed of any material generally used in systems of this type such as latex or polyethylene. The intake fitting 21a is connected with the chamber 23 (either directly as shown or, more usually, through intermediate tubing, not shown) which at its upper end is equipped with a relatively rigid insert and post structure 23a that may be insertable through the closure 12, as shown in FIG. 1. The fitting 21a at its lower end is in open communication through the closure 21 with an infeed passage 24 defined therealong which opens into an infeed chamber or flow passage 25 extending downwardly through the body part 18 and connecting through a passage 26 defined by the closure 20 with a measuring chamber 27.

The measuring chamber 27 is defined within a tubular or generally cylindrical column 28, and it enlarges from a smaller lower end to a larger upper end. In providing such enlargement along the longitudinal axis thereof, the walls of the measuring chamber 27 follow a generally logarithmic curvature which is advantageous in more correctly measuring the flow rate of a solution because it more accurately reflects any changes in such rate, as will be described in greater detail hereinafter. By way of providing an example of the extent of curvature in a typical embodiment of the invention, the measuring chamber 27 throughout an overall height or length of about 1.4 inches varies in diameter from 0.06255 of an inch at its lower end to 0.0673 of an inch at its upper end.

Mounted within the measuring chamber 27 for longitudinal movements along the length thereof is a flow-indicating restrictor 29 in the form of a ball or sphere having a diameter substantially corresponding to that of the chamber 27 adjacent the lower end thereof and being relatively heavy since it is formed of steel, although other materials such as glass and sapphire can be used. A relatively heavy metal ball, in contrast to a lightweight glass ball for example, enables closer tolerances to be maintained and thereby affords more accurate measurement in the rate of solution flow through the measuring chamber. In this respect, the ball or flow-indicating restrictor 29 assumes an elevation within the chamber 27 corresponding to the rate of flow of a solution therethrough; and when the flow rate is very low or substantially nonexistent, the indicator 29 is in the lowermost position thereof shown in FIG. 3 by full lines, and as the flow rate increases, the indicator assumes some higher elevation (such as any of those shown by broken lines in FIG. 3) until the maximum flow rate which can be indicated by the ball is attained, at which time the ball is in an uppermost position at the top of the chamber 27.

The ball 29 is confined within the measuring chamber 27 by a pair of stops or abutments 30 and 31 respectively disposed at opposite ends thereof and provided by the passage-defining closures 20 and 21. The measuring chamber 27 may be provided at its lower end with a plurality of angularly spaced and longitudinally extending channels or recesses 35—there being four in number in the meter being considered—which are not essential and in many cases are omitted. The channels 35 effectively enlarge the chamber 27 at the lower end portion thereof below the lowermost position assumable by the ball 29, and communicate at their lower ends with the passage 26.

At its upper end the measuring chamber 27 communicates through a connector passage 36, defined by the top closure 21, with the upper end of a discharge chamber 37 which is substantially cylindrical and forms adjacent its lower end an outlet for the meter 10. Such outlet is defined by a discharge nipple or fitting 20a (preferably having little or no taper therealong) adapted to have an end of the tube 14 mounted thereon, as shown in FIG. 1; and the fitting 20a connects with the discharge chamber 37 through a connector passage 38 defined by the bottom closure 20. As is most evident in FIGS. 3 and 4, the passage 25, measuring chamber 27, and discharge chamber 37 are disposed in spaced apart parallelism and are serially interconnected so that fluid flows downwardly through the intake fitting 21a into the passage 25 through the connector passage 24, from the passage 25 through the connector passage 26 to the lower end of the measuring chamber 27, upwardly through the measuring chamber 27 and through the connector passage 36 to the upper end of the discharge chamber 37, and downwardly through the discharge chamber 37 to the fitting 20a via the connector passage 38 for entrance into the tube 14.

As seen best in FIG. 3, the cylindrical tube 28 providing the measuring chamber 27 therethrough is connected with the body part 18 only at the top and bottom of the tube which is otherwise spaced from the body part. In greater particularity, the portion of the meter having the passage 25 is provided along one side thereof with a relatively thin web 39 that projects inwardly in one direction toward the measuring chamber 27. In an analogous manner, the portion of the meter having the discharge chamber 37 is equipped along one side thereof with a relatively thin web 40 that projects inwardly in the opposite direction toward the measuring chamber 27. The webs 39 and 40 are interconnected at the upper and lower ends thereof (as shown at 41 and 42, respectively), and the cylindrical tube 28 is suspended between such interconnections but is otherwise separated from the webs 39 and 40 by elongated slots 43 and 44 respectively associated therewith.

Accordingly, and considering FIG. 4 in particular, the measuring chamber 27 in a structural sense is symmetrical about the longitudinal axis thereof in being connected with the body part 18 only at the connectors 41 and 42. Therefore, during a molding operation in which the transparent body part 18 is fabricated from a moldable material, there is substantially no tendency for the measuring chamber 27 and tube 28 defining the same to distort, especially in cross section, because of differential temperature gradients which would result from nonsymmetrical masses of material 1 connected with or otherwise directly associated with the tube 28. Maintaining the measuring chamber in an undistorted condition increases the accuracy of the measurements made by the meter.

Slidably mounted on the tube 28 is an adjustable flow rate setting indicator 45 which, as seen in FIG. 4, has a central body part that is arcuate and conforms substantially to the curvature of the tube 28. The setting indicator 45 is provided along opposite sides thereof with laterally extending tabs 46 and 47 that substantially abut the webs 39 and 40 thereby constrain the setting indicator against angular displacements. As shown in FIG. 1, the webs 39 and 40 have a flow rate scale (generally denoted 48) provided therealong, and the setting indicator 45 is adapted to be positioned along the tubing 28 at a location corresponding to the scale reading denoting the desired flow rate of solution through the meter. If the actual flow rate is in correspondence with the desired rate indicated by the setting indicator 45, the ball restrictor 29 will be maintained at the elevation of the indicator 45. If the ball is at a lower position, the rate of flow is too slow and the clamp 16 is adjusted to relieve the pressure applied thereby to the tube to enlarge the passage therethrough, thereby permitting a more rapid flow of solution which will cause the ball 29 to rise. Conversely, if the flow rate is too great, the clamp 16 is adjusted to further restrict the tube 13, thereby reducing the flow therethrough and causing the ball 29 to attain a lower elevation within the measuring chamber.

As is well known, the flow rate tends to vary from time to time as a consequence of any number of factors, such as a shift in the position of the patient, and any marked deviation in rate is readily observed by noting the position of the ball 29 relative to the setting indicator 45, and compensation is readily made to correct any such deviation by adjustment of the clamp 16, as heretofore explained. The logarithmic curvature of the measuring chamber in its cooperative association with the ball restrictor 29 provides a very accurate measurement of the flow rate and lends itself to the use of automatic monitoring equipment since any deviation of the ball 29 beyond the limits of the setting indicator 45 is readily determined by such equipment (and visually) and can be used to maintain control of the rate within about 15 percent or better of any desired value, whereas in the absence of such features the change in rate could easily approach 50 percent before actionable indicia would be available.

The closures 20 and 21 are provided with transverse ribs or walls 49 and 50, respectively, that separate and essentially flow isolate the passages 26 and 38, in one case, and 24 and 36 in the other. These divider walls 49 and 50 are generally aligned with the inner extremity of the respectively associated fittings 20a and 21a and abut the adjacent surfaces of the body part 18. The closures 20 and 21 are identical molded plastic elements, and are reversely oriented relative to the body part 18, as is evident in FIG. 3. In this respect, the closures 20 and 21 and body part 18 are provided with polarizing means effective to enforce the relative orientations on these three components illustrated in FIG. 3.

In this reference, and considering FIG. 2, the body part 18 is seen to have along the lower edge thereof a pair of clips 51 disposed in general alignment with the web 39, and it has along the upper edge thereof a pair of clips 52 generally aligned with the web 40. Correspondingly, the closure 20 is provided adjacent one end portion thereof with clips 53, and the identical closure 21 is provided adjacent the same end portion with clips 54. Such clips are used in assembling the closures with the body parts and are effective to enforce a predetermined orientation upon the closures 20 and 21 relative to the body part 18 because should the closures be reversed, the clips provided thereby and by the body part would abut and prevent assembly.

The fittings 20a and 21a are offset from the centers of the respectively associated closures 20 and 21 to substantially the same extent (these components being essentially identical as heretofore stated), and as a result gravitational torque about a center axis through the body part 18 in the position thereof shown in FIG. 3 (i.e., an axis normal to the plane of the drawing) is counterbalanced and there is substantially little tendency for the flow meter to be angularly displaced about such axis. Thus, the balance of the meter and convenience of use thereof are enhanced.

A modified flow meter is illustrated in FIG. 5, and it is of somewhat simplified construction since the body part 18' (the primed form of the numerals heretofore employed being used to identify respectively corresponding components) thereof comprises for the most part only a cylindrical column 28' defining a measuring chamber 27' therewithin. The measuring chamber 27' has the logarithmic curvature explained heretofore respecting the measuring chamber 27, and a spherical flow indicator restrictor 29' is located therewithin. The body part provides a fitting 21a' having a lower flow passage therethrough communicating with the measuring chamber and connecting the same with a flexible conduit 55 serving essentially the same function as the infeed chamber 25 and supplying solution to the measuring chamber from a drip chamber 23' connected with the container 11' through the stopper 12' thereof which has a vent 13' penetrating the same. The body part also provides a fitting 20a' having an upper flow passage therethrough by means of which solution is discharged from the measuring chamber 27' and is carried to a needle (not shown) for insertion in a patient.

The modified flow meter functions in substantially the same manner as the meter theretofore describe described in detail and, therefore, no further explanation is required. Evidently, the accuracy of the meter readings will be greatest when the measuring chamber is vertically oriented, and a flow setting indicator may be used with the meter as described hereinbefore. Also, a metering clamp, (not shown) will be located along the conduit 14' to provide adjustment over the volume of solution flowing in the system. The body part 18' is advantageously attached to the conduit 55 close to the drip chamber 23', and a stiff guide or shield, possibly of U-shaped configuration, can be used along the conduit 14' to prevent it from pinching whenever the body part 18' is in a vertical orientation.

It will be appreciated that priming of the flow system is ordinarily required in order to obtain a smooth and continuous flow of solution from the container 11 to the needle 15, and priming may be accomplished by compressing or squeezing the chamber 23 to pump solution through the system and initiate flow therethrough. Priming could be effected by compressing loops of the flexible conduit 14 in the well-known manner although the compressible chamber 23 (or 23') affords a superior manner for priming the system.

Actual results obtained establish that there is a major increase in the accuracy of intravenous delivery of parenteral solutions when using the flow meter over that obtained when reliance is placed on a manual count of the drop-by-drop delivery rate. There are several reasons for such increase in accuracy in addition to the human discrepancies noted hereinbefore, and included among such reasons are: variations caused in the drip chamber due to expansion and contraction thereof which can result in the drop rate of the solution changing (from one drop every 15 seconds to one drop every 10 seconds, for example) while the rate of solution delivery to the patient remains the same; an increase with time in the size of the drops falling through the same orifice, thereby increasing the volumetric flow without change in the drop-by-drop flow rate; and the usual variations in the size of drops formed by different solutions.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

I claim:

1. A flow meter unit for intravenous injection, comprising: a rotometer including a downwardly tapered vertical chamber having a heavier than liquid movable flow restrictor therein, first conduit means for conducting fluid downwardly to the bottom of said chamber and second conduit means for conducting fluid from the top of said chamber downwardly to a meter outlet; third conduit means extending from said meter outlet for connection to a needle: flow restrictor means for adjustably varying the effective cross-sectional through flow area of said third conduit means for controlling the flow of fluid through said rotometer; a drop counting drip chamber mounted in serial flow upstream of said rotometer, having means for forming drops from the flow of fluid to said meter, and a tubular generally transparent wall for viewing the thus formed drops and counting the same; and pump means for priming said rotometer upstream of said rotometer, including said tubular generally transparent wall being highly flexible and resilient to allow cyclic squeezing between an operator's fingers to produce a pulsating action in said drip chamber and correspondingly in said rotometer chamber.

2. The flow meter of claim 1 wherein said downwardly tapered vertical chamber has a logarithmically varying internal diameter throughout its entire length.

3. A method for calibrating a rotometer used with an intravenous injection unit to measure the flow of fluid from a container through a needle to a patient, comprising the steps of: connecting the rotometer to a container having fluid to be administered to the patient; inserting the needle into a vein of the patient; providing a readily adjustable indicator for movement along the entire length of the rotometer tapered chamber having therein a freely movable flow restrictor; providing a drip chamber in serial flow with the rotometer; correlating the drips passing through said drip chamber to a known period of time to determine the approximate flow of fluid through said rotometer; providing a calibration on the fluid container to provide a visual reference for the fluid content of the container; determining the actual loss of fluid from the container according to its calibration over a relatively long period of time sufficient to obtain an accurate indication of the true fluid flow through the rotometer; thereafter adjusting the flow of fluid through the rotometer to increase or reduce the flow of fluid according to whether the actual flow of fluid was too low or too high, respectively, as determined by the observations of fluid loss within the fluid container; thereafter adjusting the indicator to register with the new position of the flow restrictor within the rotometer flow chamber; thereafter repeating the steps of determining the actual fluid flow over a relatively long period of time according to measurements of fluid loss within the fluid container, accordingly adjusting the fluid flow through the rotometer, and resetting the movable indicator to register with the flow restrictor within the rotometer flow chamber as many times as necessary to obtain a sufficiently accurate correlation between the actual fluid flow and the desired fluid flow.

4. The method according to claim 3, including the step of frictionally mounting the transparent indicator to the wall of the rotometer flow chamber.

5. The method according to claim 3, including the step of mounting the indicator on the cylindrical exterior surface of the tubular rotometer flow chamber wall by means of two synthetic resin mounting fingers arcuately extending around and frictionally gripping the flow chamber surface for more than 180° of its extent.

6. A rotometer for use in intravenous injection units having a fluid supply, and an adjustable flow restrictor leading to an injection needle unit, comprising: a single piece molded synthetic resin flow meter body having an inlet conduit, an outlet conduit, and an intermediate and parallel meter conduit; said meter conduit being formed by a tube having a supported inlet end, a supported outlet end and an intermediate portion; said intermediate portion having uniform wall thickness around its entire periphery for any transverse cross section and an interior tapering in cross-sectional area from its outlet end to its inlet end; a freely movable flow restrictor in said tube; and means positively restricting movement of said flow restrictor to the intermediate portion of said tube; integral connection braces between the inlet end of said tube and said other conduits and between the outlet ends of said tube and said other conduits so that shrinkage during manufacturing and temperature changes during use will not distort the interior shape of said intermediate portion of said tube.

7. The device of claim 6, including a first cap mounted at one end of said body to provide a flow passage from said inlet conduit to said tube inlet end, having an outlet tube coupling, and forming a flow passage between said outlet conduit and said outlet coupling; an identical second cap being attached to the opposite end of said body to provide a flow passage from the outlet end of said tube to said outlet conduit, having an inlet tube coupling, and forming a flow passage between said inlet conduit and said inlet coupling.

8. The device of claim 7, wherein said tube couplings are axially offset on opposite sides of said tube and closer to said measuring tube than either of said inlet and outlet conduits.

9. The device of claim 6 wherein said meter conduit has a logarithmically varying internal diameter throughout its entire length.